United States Patent

Hollins

[11] 3,850,152
[45] Nov. 26, 1974

[54] VEHICLE INTERNAL COMBUSTION ENGINE AIR INTAKE HEATING MEANS

[76] Inventor: Jesse R. Hollins, 40 Stoner Ave., Great Neck, N.Y. 11021

[22] Filed: Sept. 28, 1972

[21] Appl. No.: 292,925

[52] U.S. Cl. .......................... 123/122 H, 123/122 D
[51] Int. Cl. ............................................ F02m 31/00
[58] Field of Search ........ 123/122 R, 122 D, 122 F, 123/122 H, 180 E, 180 EH, 180 T, 180 R, 179 R, 179 H

[56] References Cited
UNITED STATES PATENTS

| | | | |
|---|---|---|---|
| 1,047,114 | 12/1912 | O'Neill .................... | 123/122 F UX |
| 1,319,718 | 10/1919 | Martin ..................... | 123/122 F |
| 2,058,204 | 10/1936 | Ball et al. ................ | 123/122 H |
| 2,139,777 | 12/1938 | Skok et al. ............... | 123/122 F |
| 2,142,210 | 1/1939 | Rippingille ............... | 123/122 F X |
| 2,251,630 | 8/1941 | Loeffler et al. .......... | 123/179 H X |
| 2,821,181 | 1/1958 | Dolza et al. ............. | 123/122 D |
| 3,473,522 | 10/1969 | Bailey .................... | 123/122 D |
| 3,625,190 | 12/1971 | Boissevain .............. | 123/122 F |

FOREIGN PATENTS OR APPLICATIONS

| | | | |
|---|---|---|---|
| 826,089 | 12/1951 | Germany ............... | 123/122 D |

*Primary Examiner*—Charles J. Myhre
*Assistant Examiner*—R. H. Lazarus

[57] ABSTRACT

A system wherein a first heating means directs heated air to the air filter of a vehicle internal combustion engine when the temperature of one portion of said vehicle internal combustion engine is below a predetermined amount. A second heating means consisting of a shroud is provided and is connected to the air filter. Air entering the shroud is heated by the exhaust manifold and a temperature responsive means increases the amount of air directed to the air filter from the shroud as the operating temperature of the engine increases.

4 Claims, 1 Drawing Figure

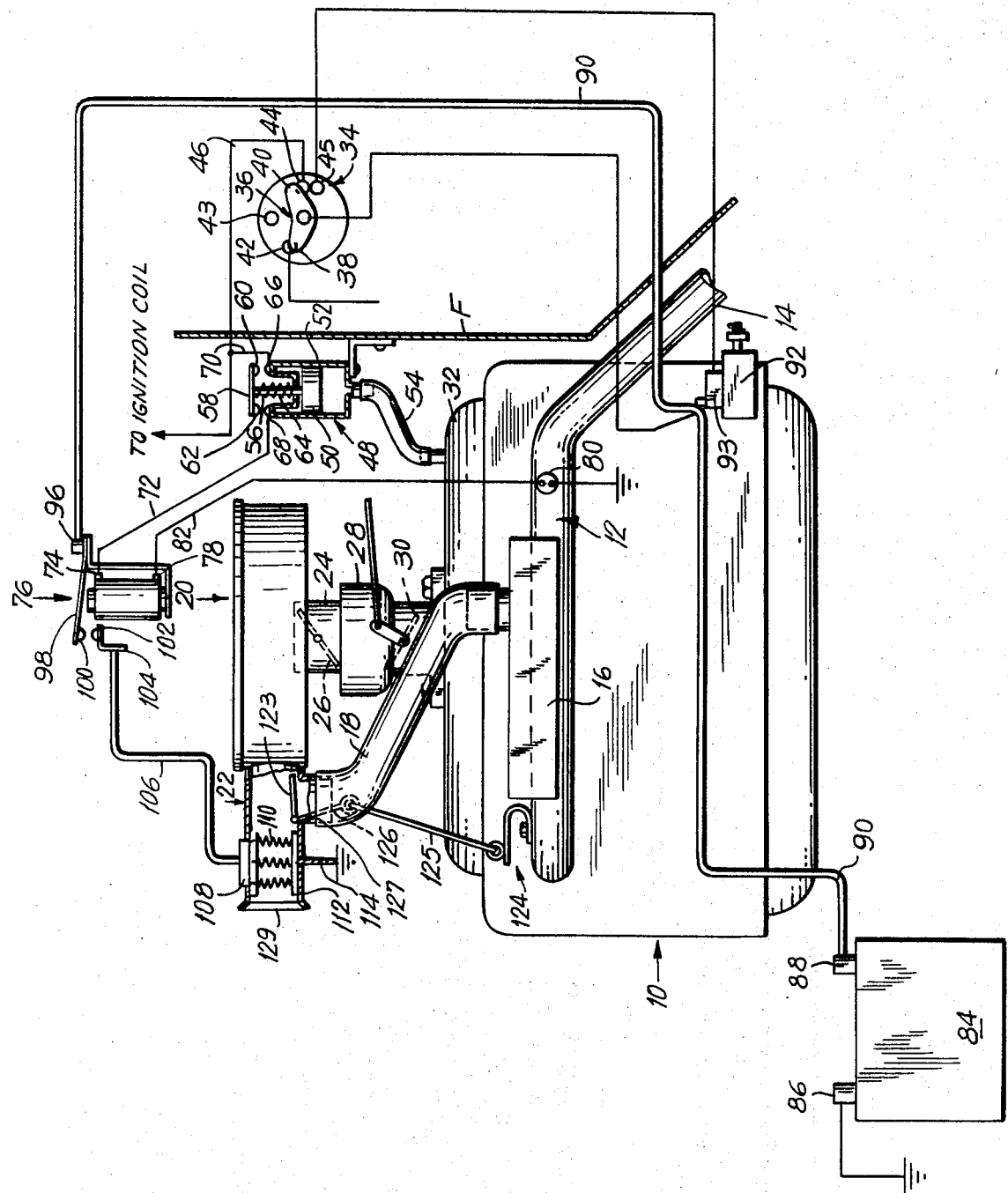

VEHICLE INTERNAL COMBUSTION ENGINE AIR INTAKE HEATING MEANS

BACKGROUND OF THE INVENTION

1. Field of the Invention

A system for providing that heated air is continuously directed to the air filter of a vehicle internal combustion engine

2. Description of the Prior Art

With the increasing concern about pollution caused by vehicle internal combustion engines, most vehicle manufacturers are directing increased attention towards reducing the discharge of hydrocarbon emissions in the exhaust products of the engine. A method utilized by vehicle manufacturers to reduce hydrocarbon emissions includes heating the air directed to the air filter and carburetor. This is accomplished by placing a metal shroud several inches above and surrounding the outside of the exhaust manifold of the engine. The metal shroud is open at its front end and is not completely sealed. A port is located at the top of the metal shroud which is tube connected to an opening in the neck of an air filter housing.

A spring loaded shutter is positioned in the neck of the air filter housing and as the engine runs the temperature of the exhaust manifold increases and the air passing over the exhaust manifold is heated. As the engine continues to operate the shutter is controlled so as to allow the heated air from the shroud to be increasingly drawn into the air filter housing and carburetor and ultimately to the air/fuel intake manifold by the sub-atmospheric pressure created by the operation of the pistons of the internal combustion engine.

The above-described method of raising the temperature of air directed to the air filter housing and carburetor is satisfactory when the internal combustion engine has been running a sufficient amount of time so that the exhaust manifold is hot. However, as will be appreciated by those skilled in the art, a certain period of running time for the internal combustion engine is required before the exhaust manifold is sufficiently hot to serve as an effective means for heating the air entering and passing through the shroud.

It has been found that an internal combustion engine operating during this period of time produces and emits in its exhaust products an extremely high quantity of hydrocarbons. This is caused by the engine operating on a mixture which includes cold or cool air. As might be expected, this problem is more serious in cold weather than in hot weather.

Most people, when starting a cold engine allow the same to fun while the vehicle is stationary. During this period of time the hydrocarbons and other undesirable pollutants in the exhaust products are discharged in a limited area which is undesirable since a substantial concentration of undesirable pollutants in a given area can cause serious discomfort to individuals in that area.

SUMMARY OF THE INVENTION

1. Purposes of the Invention

It is an object of the present invention to provide an improved system for directing heated air to the air filter and carburetor of an internal combustion engine.

Another object of the invention is to provide an improved system for directing heated air to the air filter and carburetor of an internal combustion engine, the system providing heated air to the intake manifold even when the combustion engine has not been running for a substantial period of time.

Still another object of the present invention is to provide a vehicle engine air heating system that does not draw electric current until the engine is started which otherwise would retard the flow of current to the starter motor and hence the ability of said motor to crank the engine.

Yet a further object of the present invention is to provide an improved system for continually directing heated air to the air filter and carburetor of a vehicle internal combustion engine having an air heating shroud adjacent the exhaust manifold during the period of time that the exhaust manifold is unable to sufficiently heat air that enters the shroud as a result of insufficient engine running time.

2. Brief Description of the Invention

According to the present invention, the foregoing as well as other objects are achieved by providing a vacuum controlled electric switch which is connected to the air/fuel intake manifold. The vacuum controlled electric switch is closed when the pressure in the air intake manifold is less than the atmospheric pressure by a predetermined amount. One terminal of the vacuum controlled electric switch is connected to the ignition switch. The remaining terminal of the vacuum controlled electric switch is connected to the first terminal of a relay. The relay includes a second terminal which is in circuit with a thermal switch located on the exhaust manifold housing. The thermal switch is opened when the exhaust manifold housing is above a predetermined temperature and closed when the exhaust manifold housing is below the predetermined temperature. Closing of the thermal switch closes the relay when the vacuum switch is closed.

The relay when closed places the battery on the vehicle in electrical circuit with electrical heating elements that heat the air entering the air filter housing. A conduit communicates a shroud located on the top of the exhaust manifold housing to the neck of the air filter housing. A shutter is located in said conduit and a thermal sensing means is provided for sensing rises in the temperature of the exhaust manifold housing. The shutter progressively opens when the thermal sensing means senses increased temperatures in the exhaust manifold housing. When the shutter is closed no air from the shroud is directed to the air filter.

When the driver of the vehicle turns the ignition switch on and the vehicle is started, a subatmospheric pressure is created in the air/fuel intake manifold which causes the vacuum controlled electric switch to close. Since the ignition has not been running a sufficiently long period of time the exhaust manifold housing is relatively cold and the thermal switch is closed. Accordingly, the relay is closed and the heating elements are placed in circuit with the vehicle battery. This heats the air directed to the air filter and carburetor causing a more efficient running engine which ensures that the vehicle internal combustion engine exhaust products will contain a reduced amount of hydrocarbon emissions during the vehicle warm up period. It is to be appreciated that when the engine is cold the thermal sensing means maintains the shutter closed with the shutter being progressively opened as the engine warms up during operation until the shutter is fully opened when the manifold housing reaches a given temperature.

After a sufficient period of operation, the exhaust manifold heats up and the thermal switch opens, the relay opens, and no further electrical potential is supplied to the heating elements since the exhaust manifold is now at a sufficiently high temperature so that hot air is directed from the shroud to the air intake.

Other objects of the invention will be pointed out hereinafter.

The invention accordingly consists in the features of construction, combination of elements, and arrangement of parts which will be exemplified in the system hereinafter described and of which the scope of application will be indicated in the appended claims.

BRIEF DESCRIPTION OF THE DRAWINGS

In the drawings the FIGURE is a schematic illustration of the present invention.

DESCRIPTION OF THE PREFERRED EMBODIMENT

In the FIGURE a conventional vehicle internal combustion engine 10 is illustrated and a fire wall F. An exhaust manifold housing 12 is provided for the vehicle internal combustion engine as is an exhaust manifold outlet tube 14. A stove consisting of a shroud 16, which may be conventional, is located slightly above exhaust manifold 12 and is in communication with a tube 18. The precise structure of shroud 16 is not a part of the present invention and conventional shrouds which will be apparent to those skilled in the art may be used.

An air filter housing 20 is provided and includes a neck 22 at its periphery. A carburetor neck 24 is in communication with the air filter housing and a choke butterfly valve 26 is located therein. Directly beneath carburetor neck 24 is a carburetor 28 with an accelerator control element 30 located therein. Located beneath carburetor 28 and in communication therewith is an air/fuel intake manifold 32.

An ignition switch 34 is provided and includes a movable contact blade 36 having contact arms 38 and 40. Switch contacts 42, 43, 44 and 45 are part of ignition switch 34 with switch contact 42 leading to the vehicle accessories, switch contact 43 being and "off" position of said switch, switch contact 44 via wire 46 leading to the ignition coil and switch contact 45 leading to starter motor relay 93.

A vacuum controlled electric switch 48 includes a movable piston 50 housed within a cylinder 52. The bottom of cylinder 52 is connected by a vacuum line 54 to air/fuel intake manifold 32. A rod 56 is connected to piston 50 and extends through the open upper end of cylinder 52. Attached to the uppermost portion of rod 56 is a conducting plate 58 having contacts 60 and 62 at the opposed ends thereof. A spring 64 surrounds rod 56 and biases piston 50 in an upward direction. Located on the uppermost portion of cylinder 52 are contacts 66 and 68 with contact 66 being in registry with contact 60 and contact 68 in registry with contact 62.

A wire 70 connects wire 46 to contact 66. A wire 72 connects contact 68 of vacuum controlled electric switch 48 to contact 74 of relay 76. Relay 76 includes a second contact 78 which is in circuit with a thermal switch 80 by wire 82. Thermal switch 80 is affixed to the outside surface of exhaust manifold housing 12 and is grounded. The grounding may be by conventional means or the switch may be a self-grounding switch. Thermal switch 80 is designed so as to close when sensing less than a predetermined temperature and to remain open for all other temperature conditions.

A vehicle battery 84 is provided and includes a negative terminal 86 and a positive terminal 88. Negative terminal 86 is grounded as is conventional. A heavy duty cable 90 is connected to battery terminal 88 and to relay 93 of starter motor 92. Cable 90 is also connected to contact 96 which is in circuit with relay arm 98 of relay 76. A contact 100 is located at the end of relay arm 98 furthest from contact 96 and positioned directly beneath contact 100 is a contact 102. Contact 102 is supported by a conducting bracket 104 which is in circuit with a heavy duty cable 106 that leads to a metal conducting plate 108 which is located in the neck of the air filter housing. Also located in the neck of air filter housing are heating coils 110 which are in circuit with conducting plate 108 and a ground plate 112 which is located in the neck of the air filter housing. A heavy duty cable 114 grounds ground plate 112.

A shutter 123 is located at the uppermost portion of tube 18 and controls communication between said tube and neck 22. The movement of shutter 123 is controlled by a bimetallic temperature responsive shutter control 124. Hinged to bimetallic shutter control 124 is a link 125, the upper end of which extends alongside tube 18. Hingedly connected to link 125 is a shutter arm 126. The upper portion of shutter arm 126 is connected to a shaft 127 which is journalled for rotation in neck 22. Shaft 127 extends outside of neck 22 with the shutter arm attached to the portion of the shaft outside the neck. Shutter 123 is fixed to shaft 127 inside the air filter neck and rotation of shutter arm 126 results in rotation of shaft 127 and shutter 123 in a manner that will hereinafter be described.

It is to be noted that neck 22 includes an opening 129 through which some of the air which is directed to the carburetor is drawn as will hereinafter be described.

The turning on of the ignition is accomplished by rotating contact blade 40 so that the same is in circuit with contact 45 so relay 93 is closed. Starter motor 92 then cranks the engine and combustion engine 10 is put into operation as is conventional. Blade 40 then in positioned to be electrically connected to contact 44. Within a few seconds a subatomoshperic pressure is created in the air/fuel intakes manifold 32 and the bias created by spring 64 is overcome and piston 50 is urged downwardly so that contact 60 is placed in circuit with contact 66 and contact 62 is placed in circuit with contact 68.

If the engine is relatively cold having been off for a substantial period of time, thermal switch 80 is closed and with vacuum controlled electric switch 48 closed, relay 76 closes. When this occurs, contact 100 is placed in circuit with contact 102 and an electrical potential is applied to plate 108 and across heating coils 110. The heating coils rapidly generate heat so that the air drawn into neck 22 from opening 129 is rapidly heated and heated air enters the air filter and carburetor. With the engine still cold, termperatue responsive air shutter control 124 remains in a position such that shutter 123 closes tube 18. It is thus seen that heated air is directed to the air filter and carburetor practically instantaneously when internal combustion engine 10 is started.

As the engine operates the temperature of the exhaust manifold increases which is sensed by bimetallic shutter control 124. This causes link 125 to move upwardly, shutter arm 126 to rotate in a counter clockwise direction so shutter 123 rotates in a counter clockwise direction and progressively allows more air from tube 18 to be directed to neck 22 and air filter housing 20. When the engine exhaust manifold reaches a desired temperature, switch 80 opens so that relay 76 is open. Consequently, no electrical potential is applied to heating coils 110. However, with continued engine operation shutter 123 reaches its position of maximum counter clockwise rotation and the exhaust manifold is sufficiently hot so that shroud 16 directs enough heated air to neck 22 to cause the engine to efficiently operate. Heated air then combines with ambient air entering neck 22 through opening 129 so that air at an elevated temperature reaches the air filter housing and the carburetor. It is to be appreciated that when shutter 123 is in its position of maximum counter clockwise rotation the transfer of ambient air through opening 129 to neck 22 is reduced since the shutter in this position blocks the flow of air to some extend from opening 129 to neck 22.

Exhaust manifold housing temperatures at which switch 80 opens can be fixed as desired for maxiumum efficiency. One such temperature that might be used is 350° F. Additionally, the manner in which bimetallic shutter control 124 operates shutter 123 can be adjusted to direct selected amounts of heated air to the air intake and carburetor as will be readily apparent to those skilled in the art.

It is important to note that the system becomes operative only when the internal combustion engine is running and thus no electrical energy is directed to the heating coils when the engine is starting. The system becomes operative when the engine is running since only with the engine running does the air/fuel intake manifold create a vacuum sufficient to close vacuum controlled electric switch 48.

As a result of directing heated air to the carburetor practically instantaneously with the turning on of the ignition the amount of undesirable hydrocarbon emissions in the exhaust products is reduced. Additionally, the amount of time required by the engine to undertake torque loading and to be able to accelerate the vehicle is reduced.

It should be noted that other pressure sources on a vehicle could be used for controlling operation of switch 48. As an example, the switch could be arranged to be closed by the hydraulic pressure generated by the power steering pump.

While no specific structure for the thermal switch has been set forth, any conventional thermal switch could be used.

While the electric heating elements are shown to be located in the neck of the filter housing, they may be located adjacent to the mouth of the neck of the filter housing.

It thus will be seen that there is provided a vehicle internal combustion engine air intake heating means which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

I claim:

1. A motor vehicle internal combustion engine air intake heating system for directing heated air to the carburetor of the internal combustion engine comprising an internal combustion engine, said internal combustion engine having an air filter housing, a first conduit having a first end and a second end, said first conduit first end communicating with said air filter housing, said first conduit second end communicating with atmosphere, a carburetor, means communicating said air filter housing to said carburetor, means communicating said carburetor to said internal combustion engine, an exhaust manifold for said internal combustion engine, electrical heating means located in said first conduit intermediate said first and second ends thereof, a shroud in a heat transfer relation with said exhaust manifold, a second conduit communicating said shroud to said first conduit at a point between said air filter housing and said electrical heating means, a first valve positioned to control the flow from said second conduit to said first conduit, a thermal responsive means responsive to engine temperature, linkage means connecting said thermal responsive element to said first valve so that said first valve prevents communication between said first and second conduits when said thermal responsive means is at a first temperature and progressively allows communication between said second conduit and said first conduit as said thermal responsive means increases in temperature, a motor vehicle source of electrical energy, a relay means for connecting said motor vehicle source of electrical energy to said electrical heating means, said relay means including a relay having first and second terminals, means for controlling the operation of said relay, said relay control means including a vacuum-operated fluid motor, said vacuum-operated fluid motor including a fluid movable work element, electrical connecting means movable with said movable work element, means connecting said electrical connecting means to one terminal of said relay for a given position of said fluid movable work element, a thermal switch responsive to the temperature of said internal combustion engine, means connecting said thermal switch to be remaining terminal of said relay, said thermal switch opening upon being above a predetermined temperature and being closed upon being below a predetermined temperature, an ignition switch, said ignition switch including a movable contact blade and an engine on contact, and means connecting said source of electrical energy to said electrical connecting means when said movable contact blade is in contact with said engine on terminal.

2. A system according to claim 1 wherein biasing means is provided which urges said movable work element to a position such that said electrical connecting means is disconnected from said one terminal of said relay.

3. A system according to claim 1 wherein said thermal switch is affixed to said engine exhaust manifold.

4. A system according to claim 1 wherein said fluid motor includes a cylinder with said work element being a piston therein, and said electrical connecting means movable with said piston.

* * * * *